(12) United States Patent
Kawato

(10) Patent No.: US 7,930,398 B2
(45) Date of Patent: Apr. 19, 2011

(54) DISTRIBUTED COMPUTING SYSTEM FOR RESOURCE RESERVATION AND USER VERIFICATION

(75) Inventor: Masahiro Kawato, Tokyo (JP)

(73) Assignee: NEC Corporation, Tokyo (JP)

( * ) Notice: Subject to any disclaimer, the term of this patent is extended or adjusted under 35 U.S.C. 154(b) by 1635 days.

(21) Appl. No.: 11/000,638

(22) Filed: Dec. 1, 2004

(65) Prior Publication Data

US 2005/0117587 A1    Jun. 2, 2005

(30) Foreign Application Priority Data

Dec. 1, 2003   (JP) ................................ 2003-402167

(51) Int. Cl.
  *G06F 15/173* (2006.01)
(52) U.S. Cl. ........................................................ 709/226
(58) Field of Classification Search ................... 709/226
  See application file for complete search history.

(56) References Cited

U.S. PATENT DOCUMENTS

| | | | | |
|---|---|---|---|---|
| 5,349,682 A * | 9/1994 | Rosenberry | ................ | 718/102 |
| 5,630,128 A * | 5/1997 | Farrell et al. | ................ | 718/103 |
| 5,712,712 A * | 1/1998 | Sayward | ................ | 358/403 |
| 5,826,082 A * | 10/1998 | Bishop et al. | ................ | 718/104 |
| 5,889,944 A * | 3/1999 | Butt et al. | ................ | 709/203 |
| 6,571,391 B1 * | 5/2003 | Acharya et al. | ................ | 725/87 |
| 6,598,067 B1 * | 7/2003 | Wydra et al. | ................ | 718/100 |
| 7,418,506 B1 * | 8/2008 | Achtermann et al. | ........ | 709/227 |
| 2002/0083185 A1* | 6/2002 | Ruttenberg et al. | ........... | 709/232 |
| 2003/0069973 A1* | 4/2003 | Ganesan et al. | .............. | 709/226 |
| 2003/0078965 A1* | 4/2003 | Cocotis et al. | ................ | 709/203 |
| 2004/0250060 A1* | 12/2004 | Diep et al. | ..................... | 713/155 |
| 2008/0034369 A1* | 2/2008 | Polizzi et al. | ................. | 718/102 |

FOREIGN PATENT DOCUMENTS

JP          2000-259537         9/2000

OTHER PUBLICATIONS

Ian Foster et al., "A Security Architecture for Computational Grids", Proceedings of the 5th ACM Conference on Computer and Communication Security, pp. 83-92, 1998.
Susaki, Seiichi, "An Introduction to Practical Data Security", Gekkan Barcode, Japan, Japan Industrial Publishing Co., Ltd., Oct. 2, 2003, vol. 16, No. 2, pp. 61-65, in particular pp. 61-63.

* cited by examiner

*Primary Examiner* — Dohm Chankong
*Assistant Examiner* — Tauqir Hussain
(74) *Attorney, Agent, or Firm* — Scully, Scott, Murphy & Presser, P.C.

(57) ABSTRACT

In a distributed computing system, an end terminal transmits a job execution request to a job scheduler, which in response determines a resource and a job execution period necessary for executing a job on the resource based on contents of the job indicated in the message. A reservation request message containing the job execution period and the resource identity is sent from the job scheduler to a target resource proxy. The resource proxy determines a scheduled period of the resource based on the job execution period by checking its schedule memory, and transmits a reservation response to the job scheduler. The job scheduler acquires a certificate signed by the user from the end terminal and transmits the acquired certificate to the resource proxy. In response to the certificate of the user, the resource proxy makes a reservation of the identified resource according to the scheduled period.

15 Claims, 10 Drawing Sheets

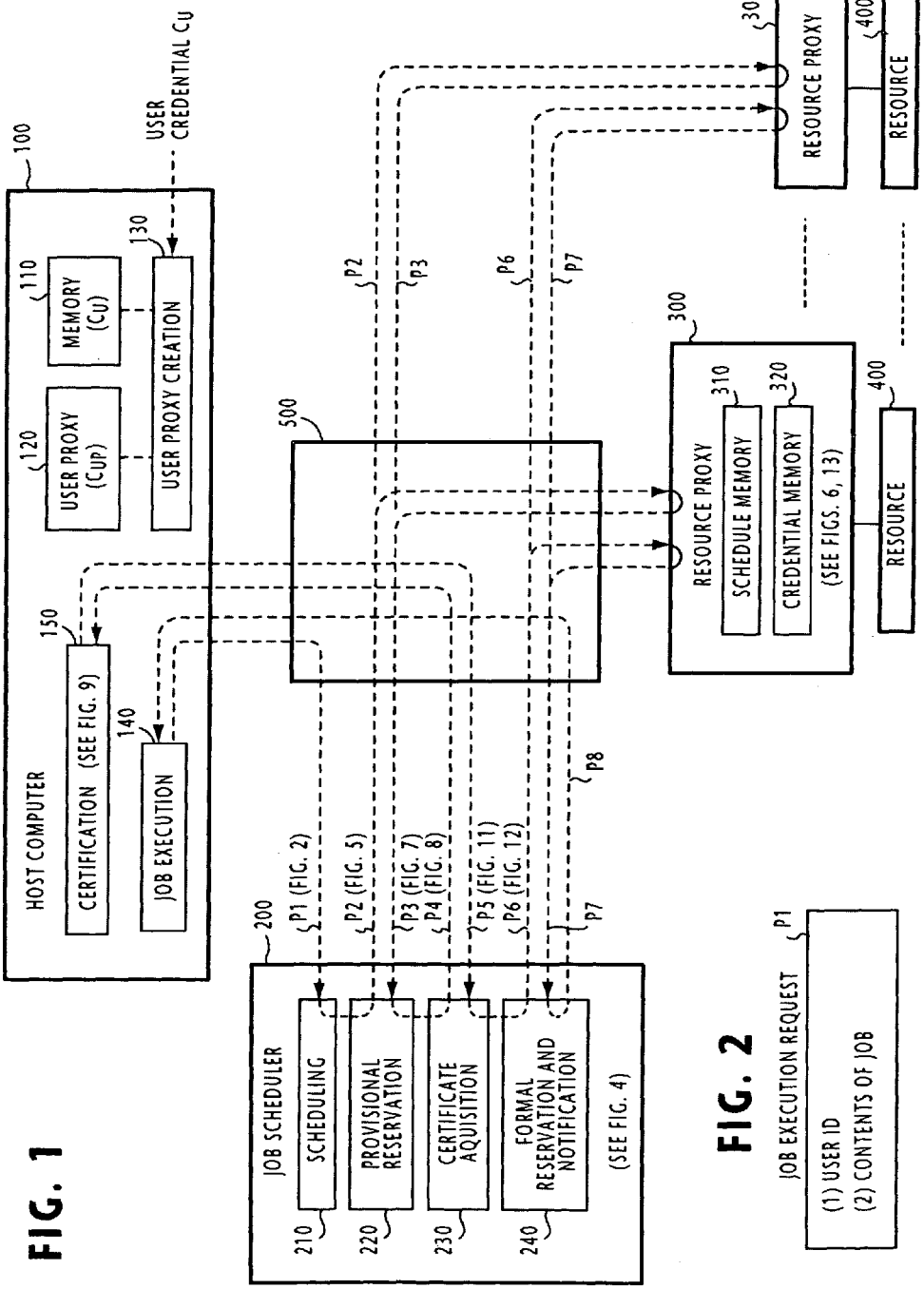

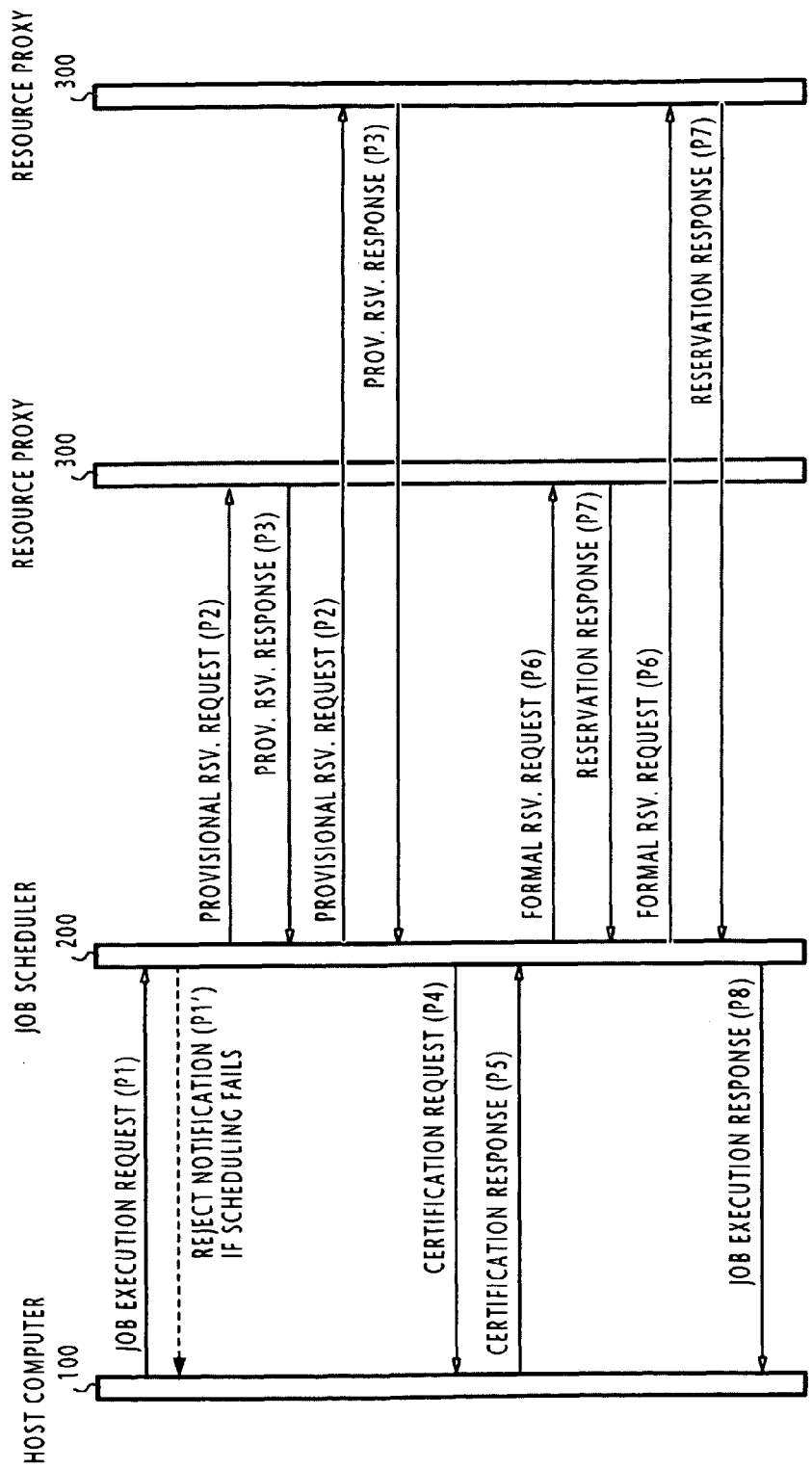

JOB SCHEDULER

RESOURCE PROXY

FIG. 7

PROVISIONAL RESERVATION RESPONSE  P3

SUCCESS INDICATION
(CERTIFICATION REQUEST)
(1) RESERVATION ID
(2) USER ID
(3) SCHEDULED PERIOD
(4) PUBLIC KEY

FAILURE INDICATION

FIG. 8

CERTIFICATION REQUEST  P4

RESOURCE PROXY 300-1
(1) RESERVATION ID
(2) USER ID
(3) SCHEDULED PERIOD
(4) PUBLIC KEY

RESOURCE PROXY 300-2
(1) RESERVATION ID
(2) USER ID
(3) SCHEDULED PERIOD
(4) PUBLIC KEY

RESOURCE PROXY 300-N
(1) RESERVATION ID
(2) USER ID
(3) SCHEDULED PERIOD
(4) PUBLIC KEY

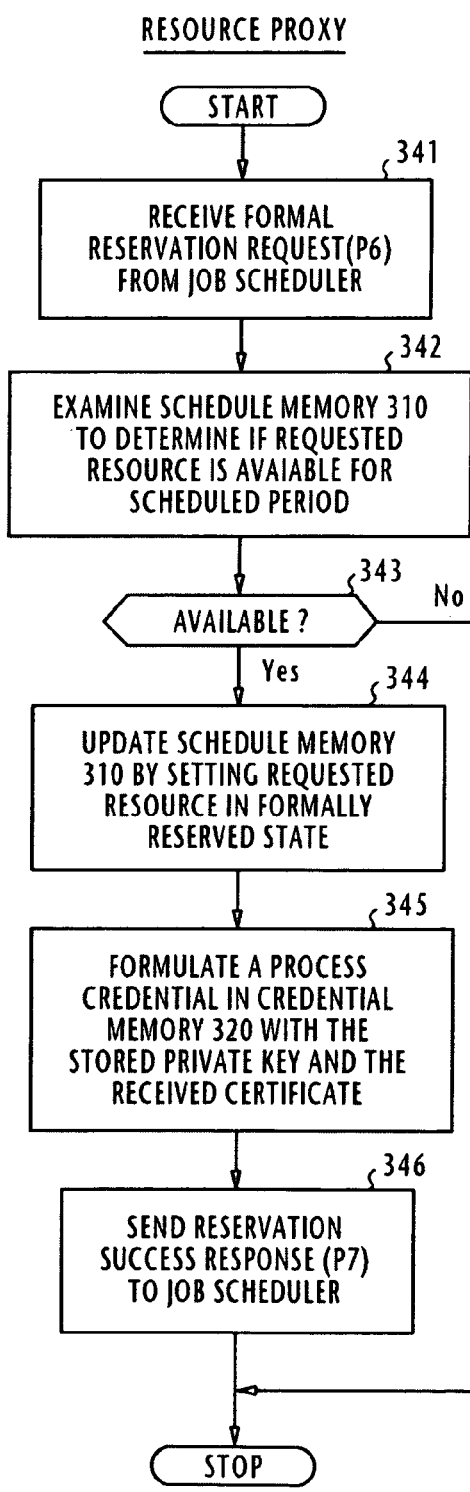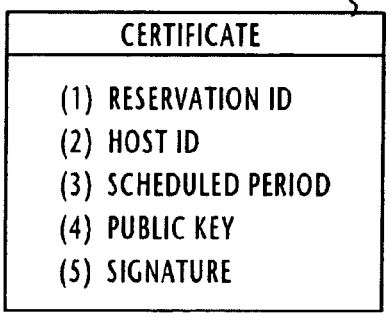

DISTRIBUTED COMPUTING SYSTEM FOR RESOURCE RESERVATION AND USER VERIFICATION

BACKGROUND OF THE INVENTION

1. Field of the Invention

The present invention relates to a distributed computing system for performing resource reservation and user verification using distributed computing resources.

2. Description of the Related Art

The current distributed computing system comprises a plurality of domains (or trust domains) of logical structure where integral local security policy is established. Each domain is a cluster of computing entities such as routers, log servers and/or parallel computer controlled by a common management and security policy. For those computing entities that belong to the same trust domain, it is not necessary to repeat user verification between resources once user verification is established. However, if computing entities belong to different domains, verification is necessary for each domain. If a user desires to activate multiple resources belonging to different trust domains, verification is necessary for the user to access each resource. In addition, if multiple processes are activated on different resources, verification is required between the activated resources. It is therefore troublesome for users to perform verification procedures themselves. Therefore, there exists a need to develop a single sign-on verification system that eliminates the need to repeat user verification once the user is verified.

To alleviate the problem discussed above, the technique known as Grid Security Infrastructure (GSI) has been developed. According to this technique, a resource proxy is defined to act as an agent for translating inter-domain security operations and local intra-domain mechanisms as described in Ian Foster et al., "A Security Architecture for Computational Grids", Proceedings of the 5th ACM Conference on Computer and Communication Security, pages 83-92, 1998. In the known distributed computing system, a host computer is connected through a communications network to a number of resource proxies each being associated with one or more computing resources. Each resource proxy holds information known as "resource credential $C_{RP}$" to identify a particular resource. One such example is a combined set of a certificate signed by a certificate authority and a non-encrypted private key. On each computing resource, a user process is activated in response to a request from the user. The user process holds information known as "process credential" to verify the ownership of the process.

On the host computer, a user proxy is created to perform "resource allocation and process creation" in response to a request from the user and a "resource allocation from a user process" in response to a request from an activated user process of other domain. The user proxy maintains information known as "user proxy credential $C_{UP}$" which is valid for a limited period of time. A mutual verification proceeds between the user process on the host computer and the resource proxy via the communications network to confirm that the valid period of the user proxy credential is not expired. For verification on the user side, the user proxy credential $C_{UP}$ is used and for verification on the resource side the resource credential $C_{RP}$ is used.

Once verification is successful between a user proxy and a resource proxy, the user proxy requests the resource proxy to allocate a resource by submitting to it a signed request message. The resource proxy checks with the local security policy and determines whether the requested resource can be allocated to the user if the request is accompanied with the user proxy credential signature. If permission is granted to the request, the resource proxy generates a "resource-credentials tuple" indicating user ID and resource IDs and safely hands it over to the user proxy. If the user proxy determines that it is acceptable, the user proxy signs it and creates a process credential $C_P$ of the requested resource and sends it back to the resource proxy. The resource proxy then allocates the requested resource. On the allocated resource the user process is activated and the process credential $C_P$ is handed over to the activated user process.

When a user process, which is activated on an allocated resource, is in need of another computing resource, a mutual verification proceeds between the activated user process and the user proxy using the process credential $C_P$ to verify the user process and the user proxy credential $C_{UP}$ to verify the user proxy. If the verification is successful, the activated user process on the allocated resource requests the user proxy to allocate a signed resource. In response to this request, the user proxy performs a resource allocation with a resource proxy, which is associated with the requested resource.

However, the prior art distributed computing system has the following shortcomings:

a) During a resource reservation process, the user has the trouble of specifying details for scheduling the necessary resources;

b) The user process, which is activated on a reserved computing resource, is not capable of acting as an agent for the user to perform user verification with other resources during the limited period of reservation; and c) When a reserved resource is activated, the user has the trouble of manually performing user verification.

SUMMARY OF THE INVENTION

It is therefore an object of the present invention to provide a distributed computing system capable of automatically making a resource reservation on behalf of users in order to reduce the burden on the users.

According to a first aspect of the present invention, there is provided a communications network, an end terminal for transmitting a job execution request message of a user to the communications network, a first entity responsive to the job execution request message, determining a resource and a job execution period necessary for executing a job on the resource based on contents of the job indicated in the job execution request message, generating a reservation request message containing the job execution period and a resource identity of the resource, and transmitting the reservation request message to the communications network, and a second entity connected to the communications network for receiving the reservation request message, determining a scheduled period of a resource identified by the resource identity contained in the received message based on the job execution period, and making a reservation of the identified resource according to the determined scheduled period.

According to a feature of the present invention, the second entity is configured to generate a private key, and transmit a reservation response message containing a public key to the first entity. The first entity responds to the reservation response message by acquiring from the end terminal a certificate which includes a copy of the public key and is electronically signed by the user and transmitting the certificate to the second entity. The second entity responds to receipt of the certificate from the first entity by making a reservation of the resource, and forming a combined set of the private key and the received certificate to produce a process credential, which will be used to verify the user when the reserved resource is activated during the scheduled period.

According to another feature of the present invention, the first entity is configured to transmit a certification request message to the end terminal containing the determined scheduled period in response to the reservation response message from the second entity. The end terminal responds to the certification request message from the first entity by making a decision whether the scheduled period contained in the received message is within the valid period of user proxy credential, and transmitting to the first entity a certificate containing a signature of the user proxy credential if the decision is affirmative or a signature of user credential if the decision is negative.

According to a second aspect of the present invention, there is provided a job scheduler for a distributed computing system, wherein the distributed computing system comprises a communications network, an end terminal for transmitting a job execution request message of a user to the communications network, and a resource proxy, and wherein the resource proxy is connected to the network for receiving a reservation request message from the network, determining a scheduled period of a resource identified by a resource identity contained in the received message based on a job execution period, and making a reservation of the identified resource according to the determined scheduled period. The job scheduler comprises processing circuitry responsive to the job execution request message from the end terminal for determining a resource and a job execution period necessary for executing a job on the resource based on contents of the job indicated in the job execution request message, generating a reservation request message containing the job execution period and the resource identity of the determined resource, and transmitting the reservation request message to the resource proxy.

According to a third aspect of the present invention, there is provided an end terminal for a distributed computing system, wherein the system comprises a communications network, a job scheduler connected to the network for receiving a job execution request message from the network, determining a resource and a job execution period necessary for executing a job on the resource based on contents of the job indicated in the job execution request message, generating a reservation request message containing the job execution period and a resource identity of the resource, and transmitting the reservation request message to the network, and a resource proxy connected to the job scheduler via the network for receiving the reservation request message, determining a scheduled period of the resource based on the job execution period and transmitting a reservation response message to the job scheduler which is responsive to the reservation response message for acquiring a certificate electronically signed by the user from the end terminal and transmitting the certificate to the resource proxy which is responsive to the certificate for making a reservation of a resource according to the determined scheduled period and the resource identity of the reservation request message. The end terminal comprises processing circuitry for transmitting the job execution request message to the job scheduler via the network, responsive to a certification request message from the job scheduler containing the scheduled period for making a decision whether the scheduled period contained in the received message is within the valid period of user proxy credential, and transmitting to the job scheduler the certificate containing a signature of the user proxy credential if the decision is affirmative or a signature of user credential if the decision is negative.

According to a fourth aspect of the present invention, there is provided a resource proxy for a distributed computing system, wherein the system comprises a communications network, an end terminal for transmitting a job execution request message of a user to the communications network, and a job scheduler responsive to the job execution request message, for determining a resource and a job execution period necessary for executing a job on the resource based on contents of the job indicated in the job execution request message, generating a reservation request message containing the job execution period and a resource identity of the determined resource, and transmitting the reservation request message to the network, and responsive to a certification request message from the network for acquiring a certificate electronically signed by the user from the end terminal and transmitting the certificate to the network. The resource proxy comprises processing circuitry for receiving the reservation request message from the job scheduler, determining a scheduled period of the resource based on the job execution period, transmitting to the job scheduler the certification request message, and responsive to the certificate from the job scheduler for making a reservation of a resource according to the resource identity of the reservation request message and the determined scheduled period.

According to a fifth aspect, the present invention provides a method of activating distributed computing resources, comprising the steps of (a) transmitting a job execution request message of a user from an end terminal, (b) receiving, at a job scheduler, the job execution request message from the end terminal and determining a resource and a job execution period necessary for executing a job on the resource based on contents of the job indicated in the job execution request message and formulating a reservation request message containing the determined job execution period and a resource identity of the resource and transmitting the reservation request message, and (c) receiving, at a resource proxy, the reservation request message from the job scheduler and determining a scheduled period of the resource based on the job execution period contained in the received message, and making a reservation of a resource according to the resource identity of the reservation request message and the determined scheduled period.

According to a user verification feature of the present invention, step (c) comprises the steps of ($c_1$) generating, at the resource proxy, a private key, ($c_2$) transmitting a reservation response message containing a public key from the resource proxy to the job scheduler, ($c_3$) acquiring a certificate electronically signed by the user from the end terminal in response to the reservation response message, the certificate including a copy of the public key, ($c_4$) transmitting the acquired certificate from the job scheduler to the resource proxy, ($c_5$) making, at the resource proxy, a reservation of the resource in response to receipt of the certificate, and ($c_6$) forming a process credential with the private key and the acquired certificate for verifying the user when the reserved resource is activated during the scheduled period.

According to an additional feature, the step ($c_3$) comprises the steps of transmitting a certification request message from the job scheduler to the end terminal containing the determined scheduled period, receiving, at the end terminal, the certification request message, making a decision, at the end terminal, whether the scheduled period contained in the received reservation response message is within the valid period of user proxy credential, and transmitting, from the end terminal to the job scheduler, the certificate containing a signature of the user proxy credential if the decision is affirmative or a signature of user credential if the decision is negative.

BRIEF DESCRIPTION OF THE DRAWINGS

The present invention will be described in detail further with reference to the following drawings, in which:

FIG. 1 is a block diagram of an exemplary embodiment of the distributed computing system of the present invention;

FIG. 2 is an illustration of a job execution request message transmitted from the host computer to the job scheduler of FIG. 1;

FIG. 3 is a sequence diagram of the overall operation of the system;

FIG. 7 is an illustration of a success/failure indication response message transmitted from each resource proxy to the job scheduler during the provisional reservation process;

FIG. 8 is an illustration of a certification request message transmitted from the job scheduler to the host computer at the end of the provisional reservation process;

FIG. 12 is an illustration of a formal reservation request message transmitted from the job scheduler to each of the target resource proxies during the formal reservation process;

FIG. 13 is a flowchart of the operation of each resource proxy during a formal reservation process.

DETAILED DESCRIPTION

Figure 4:
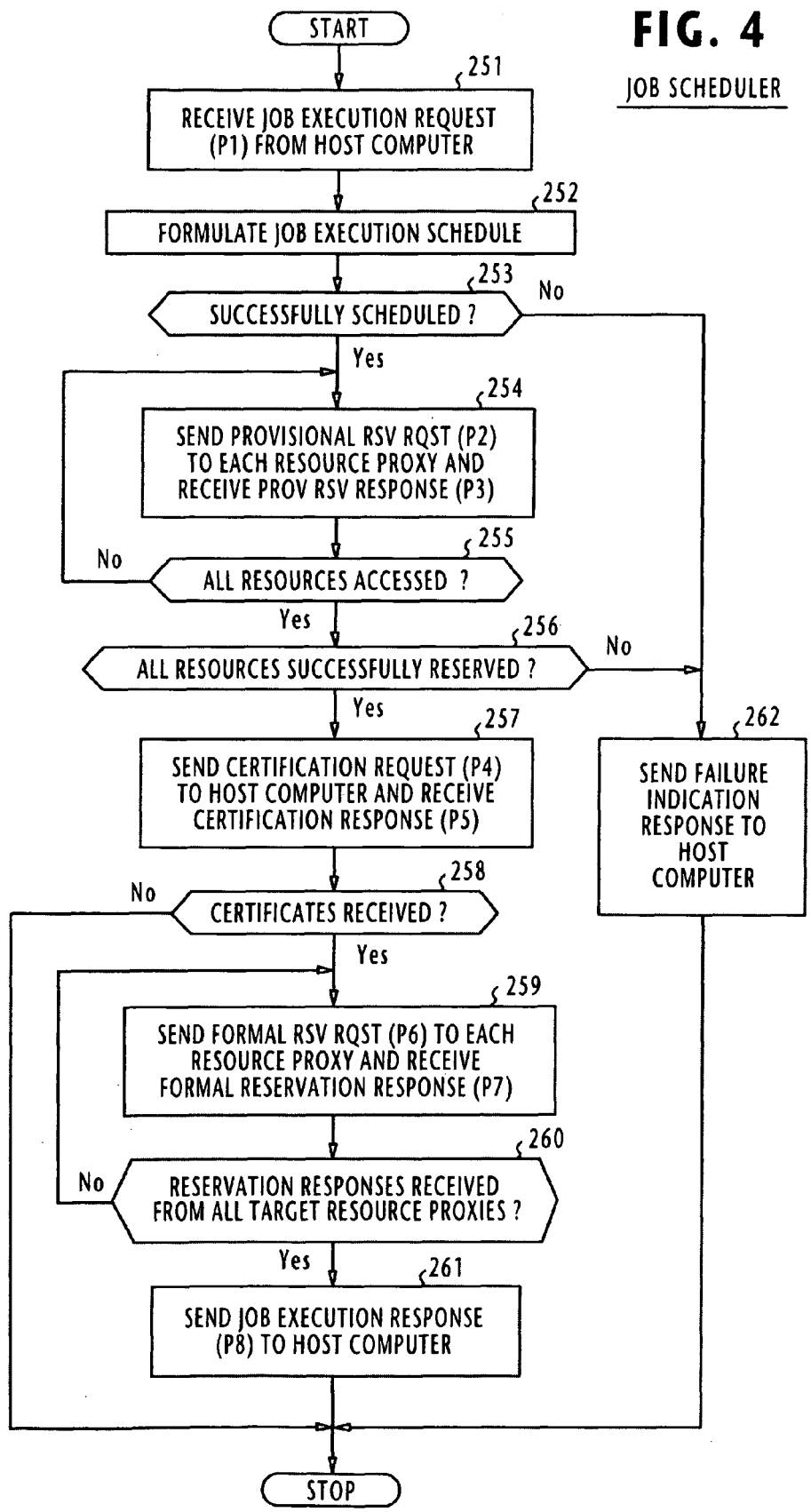
FIG. 4 is a flowchart of the operation of the job scheduler.

Referring now to FIG. 1, there is shown a distributed computing system of the present invention for implementing user verification resource reservation. In an exemplary embodiment, the system is comprised of at least one host computer 100, a job scheduler 200, a plurality of resource proxies 300 and a plurality of computing resources 400, such as parallel computers, storage systems, log servers and routers connected to the resource proxies 300. Host computer 100 is connected to the job scheduler 200 via a communications network 500, such as WAN or IP network, and the job scheduler is connected via the communications network 500 to the resource proxies 300. Unlike the prior art, no logical connections are directly established between the host computer 100 and the resource proxies 300 during resource reservation. Instead, the job scheduler 200 is responsible for performing transactions with the resource proxies 300 on behalf of the host computer 100.

Host computer 100 includes a processor and a user credential memory 110 for storing "user credentials $C_U$" of users registered with the host computer 100. Each of the stored user credentials is encrypted by a password. In a user verification resource reservation process, the user submits a user credential $C_U$ to the host computer for verifying the authenticity of the user. Typically, the user credential is a combination of a user ID and a password. Another example of the user credential is an X.509 public-key certificate standardized by ITU (International Telecommunication Union) and a private key encrypted by a pass-phrase. This certificate includes a user ID, a user's public key, a digital signature by CA (Certification Authority), a trusted third party that guarantees the validity of the public key. This certificate is valid for a period, usually one to several years. A password is necessary to decipher the private key.

To use a stored user credential $C_U$ it is necessary for the user to enter the password for decryption. For each of the registered users, the processor of the host computer performs a user proxy creation process 130 to create a user proxy 120 in response to the password input from the user. In the user proxy creation process 130, a "user proxy credential $C_{UP}$" is produced and stored in the user proxy 120. The user proxy credential $C_{UP}$ is valid for a specified timeout period, which is usually several hours or more. When the specified timeout period expires, the user proxy 120 itself ceases to exist. User proxy 120 is responsible for performing a user verification procedure when a resource is reserved.

In more detail, the user proxy 120 is created when a registered user first gains access to the host computer 100 by using a verification process provided by the operating system (OS)/middleware of the host computer 100. Host computer 100 creates a user proxy credential $C_{UP}$ when the user submits a user credential $C_U$. If the user credential is a combined set of an X.509 certificate and a private key, the pass-phrase of the private key needs to be entered to activate the user proxy. User proxy credential $C_{UP}$ is a combination of user ID, host ID and data indicating its valid period. Host computer 100 then activates the user proxy 120 and hands over the user proxy credential $C_{UP}$ to the user proxy 120.

Each of the resource proxies 300 holds information known as a "resource credential" for identifying a specific resource. Typically, the resource credential is a combination of a certificate signed by CA (Certification Authority) and a private key that is not encrypted.

Some of the resources 400 may include a resource allocation function for allocating part or whole of its capabilities or a start/stop function of a user process, which will be activated in response to a user request. The user process maintains information known as a "process credential" for verifying the requesting user when the latter uses the reserved resource. The associated resource proxy 300 manages these functions in schedule management process. If such a resource is a computer, a resource proxy and the associated resource can be implemented in a single computer. Each resource proxy 400 includes a schedule memory 310 and a process credential memory 320.

As described in detail later, the schedule memory 310 maintains a time schedule for users for using the processes of the associated resource 400. In response to a provisional reservation request message from the job scheduler, the resource proxy 300 examines the schedule memory 310 to test for the availability of a requested resource to execute a requested job and replies with a message containing a scheduled period indicating the start and end timings of a resource which is set in a provisionally reserved state. A private key is then generated and stored in the process credential memory 320. In response to a formal reservation request from the job scheduler, the resource proxy 300 receives a user-signed certificate and stores it in the process credential memory 320 and combines it with the previously stored private key to form a process credential $C_P$ and sets the provisionally reserved resource in a formally reserved state if that resource is actually available. When the reserved resource is later activated, the credential $C_P$ is used in verifying the authenticity of the user.

Host computer 100 performs job execution process 140 by sending a job execution request message P1 to the job scheduler 200 via the communications network 500 when a registered user enters a job execution command. As shown in FIG. 2, the job execution request message P1 includes (1) user ID of the registered user and (2) contents of the job to be executed.

The operation of the system begins with the transmission of the job execution request message P1 and proceeds as illustrated in the sequence diagram of FIG. 3, which will be useful throughout the specification for understanding the overall operation of the system.

In response to the job execution request message P1, the job scheduler 200 activates scheduling process 210, provisional reservation process 220, certificate acquisition process 230 and formal reservation and notification process 240 in sequence according to the flowchart of FIG. 4.

In FIG. 4, when the job scheduler 200 receives a job execution request message P1 from the host computer 100 (step 251), flow proceeds to step 252 to examine a schedule memory (not shown) and the contents of the job to be executed and determines a number of resources (or processes) to be activated to execute the requested job and the amount of time (i.e., job execution period) necessary for each process to execute a job based on data indicating its contents received in the job execution request message P1. If this scheduling is successful, the job scheduler 200 formulates a job execution schedule for the determined resources. The job execution schedule is a list of resources and a corresponding list of job execution periods in which the corresponding resources will be activated to execute the requested job. If there is no appropriate resource to execute the requested job, the job scheduler determines that scheduling has failed, and proceeds from step 253 to step 262 to transmit a failure indication response message to the host computer 100 as indicated by a dotted line in FIG. 3. If scheduling is successful, the job scheduler proceeds from step 253 to step 254 to formulate a provisional reservation request message P2 for each of the target resources 400 based on the job execution schedule produced in step 252 and transmits it to the resource proxy 300 associated with that target resource 400.

Figure 5:
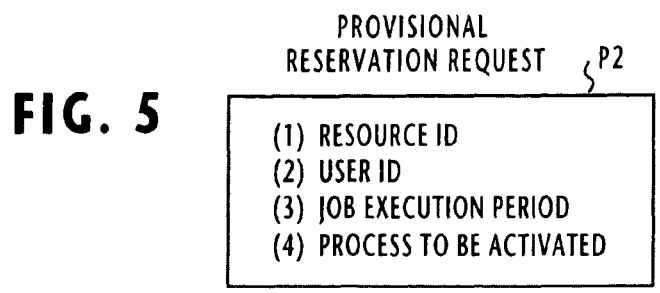
FIG. 5 is an illustration of a provisional reservation request message transmitted from the job scheduler to each of the resource proxies.

As shown in FIG. 5, the provisional reservation request message P2 for each resource proxy 300 includes four items of information, (1) resource ID identifying a resource to be reserved, (2) user ID, (3) job execution period, and (4) a process to be activated.

Job scheduler 200 then receives a provisional response message P3 from the target resource proxy 300. Transmission of request message P2 and reception of response message P3 are repeated between the job scheduler 200 and each resource proxy 300 by executing step 254 until all resources are provisionally reserved (step 255).

Figure 6:
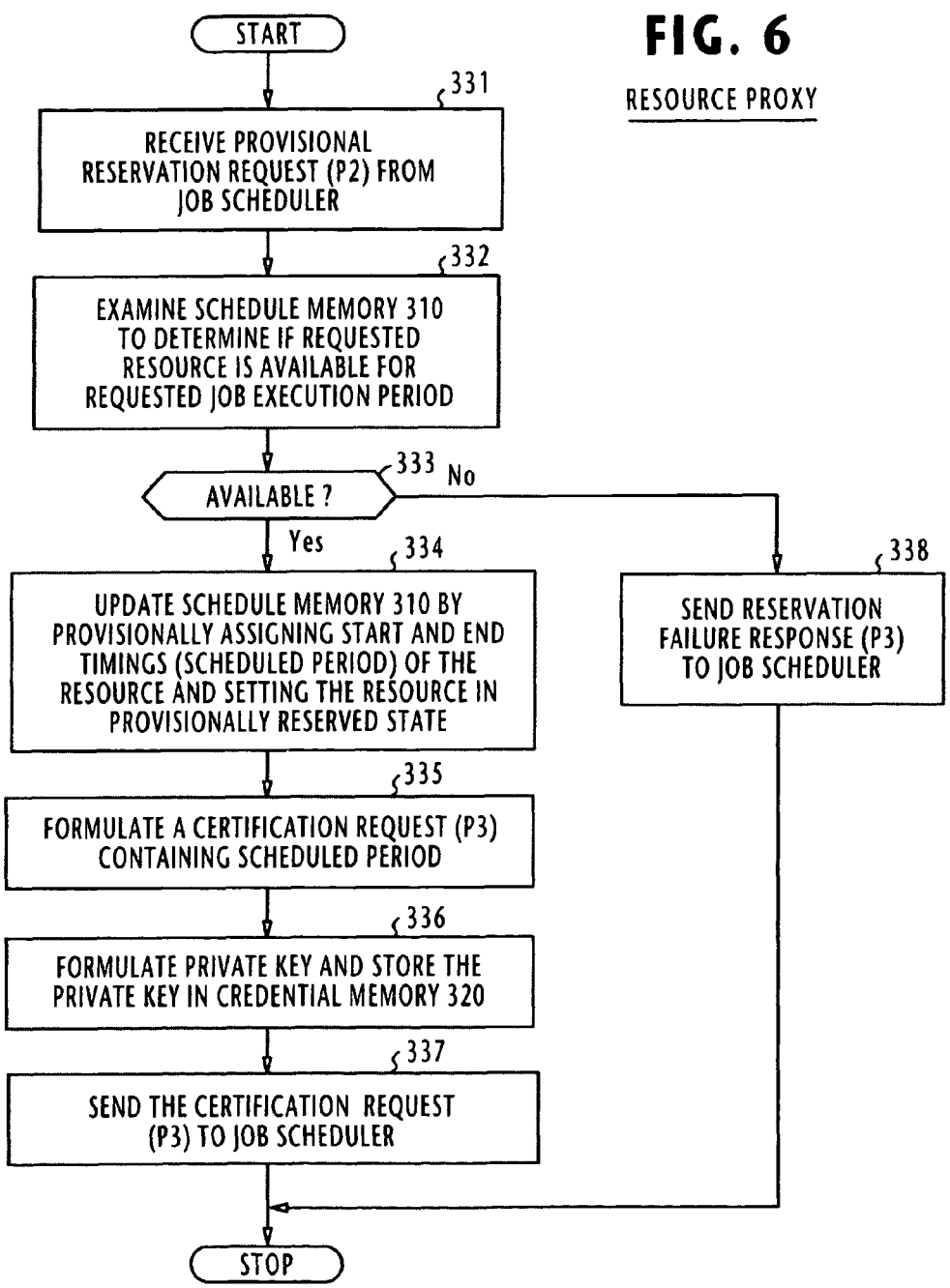
FIG. 6 is a flowchart of the operation of each resource proxy during a provisional reservation process.

During provisional reservation process 220 just described above, each of the resource proxies 300 operates according to the flowchart of FIG. 6. In response to a provisional reservation request message P2 from the job scheduler 200 (step 331), the resource proxy 300 examines its schedule memory 310 using the time data contained in the received message P2 and determines whether the requested resource (process) is available (steps 332, 333). If the requested resource is available, flow proceeds from step 333 to step 334 to update the schedule memory 310 by provisionally assigning a scheduled period (i.e., the time of day for starting a process on the requested resource and the time of day for ending the process) based on the received time data and setting the requested resource in a provisionally reserved state. If there is another request contending for the same resource in the same period of time or if the requested resource is already set in a provisionally reserved state, the decision is negative at step 333 and flow proceeds to step 338 to return a reservation failure response message P3 to the job scheduler 200.

At step 335, the resource proxy 300 formulates a provisional reservation response message P3 with a certification request. At step 336, the resource proxy 300 formulates a private key based on a generated pseudorandom number and stores it in the credential memory 320. The stored private key will be later combined with a received user-signed certificate to form a "process credential".

As shown in FIG. 7, the provisional reservation response message P3 includes a success indication field containing the certification request. The certification request includes (1) resource ID identifying the provisionally reserved resource, (2) the user ID, (3) the scheduled period, and (4) public key. The public key is produced in pair with the private key. Provisional reservation response message P3 further includes a failure indication field which is marked to indicate a failure if provisional reservation fails. The provisional reservation response message P3 is then transmitted to the job scheduler 200 (step 337).

Returning to FIG. 4, after receiving the provisional reservation response messages P3 from all target resource proxies 300 in a manner just described, the job scheduler 200 proceeds from step 255 to step 256 to determine whether all resources are successfully reserved. If not, flow proceeds to step 262 to transmit a failure indication response message to the host computer 100.

If the decision is affirmative at step 256, the job scheduler 200 enters a certificate acquisition process 230. In this process, the job scheduler formulates a certification request message P4 and transmits this request message to the host computer 100 (step 257). As illustrated in FIG. 8, the certification request message P4 is a list of certification requests respectively corresponding to the target resource proxies 300. Each of the certification requests of the list is a copy of the certification request contained in the corresponding provisional reservation response message P3. After transmission of the certification request message P4 to the host computer 100, the job scheduler 200 waits for a returning certification response P5. Host computer 100 now performs a certification process 150.

Figure 9:
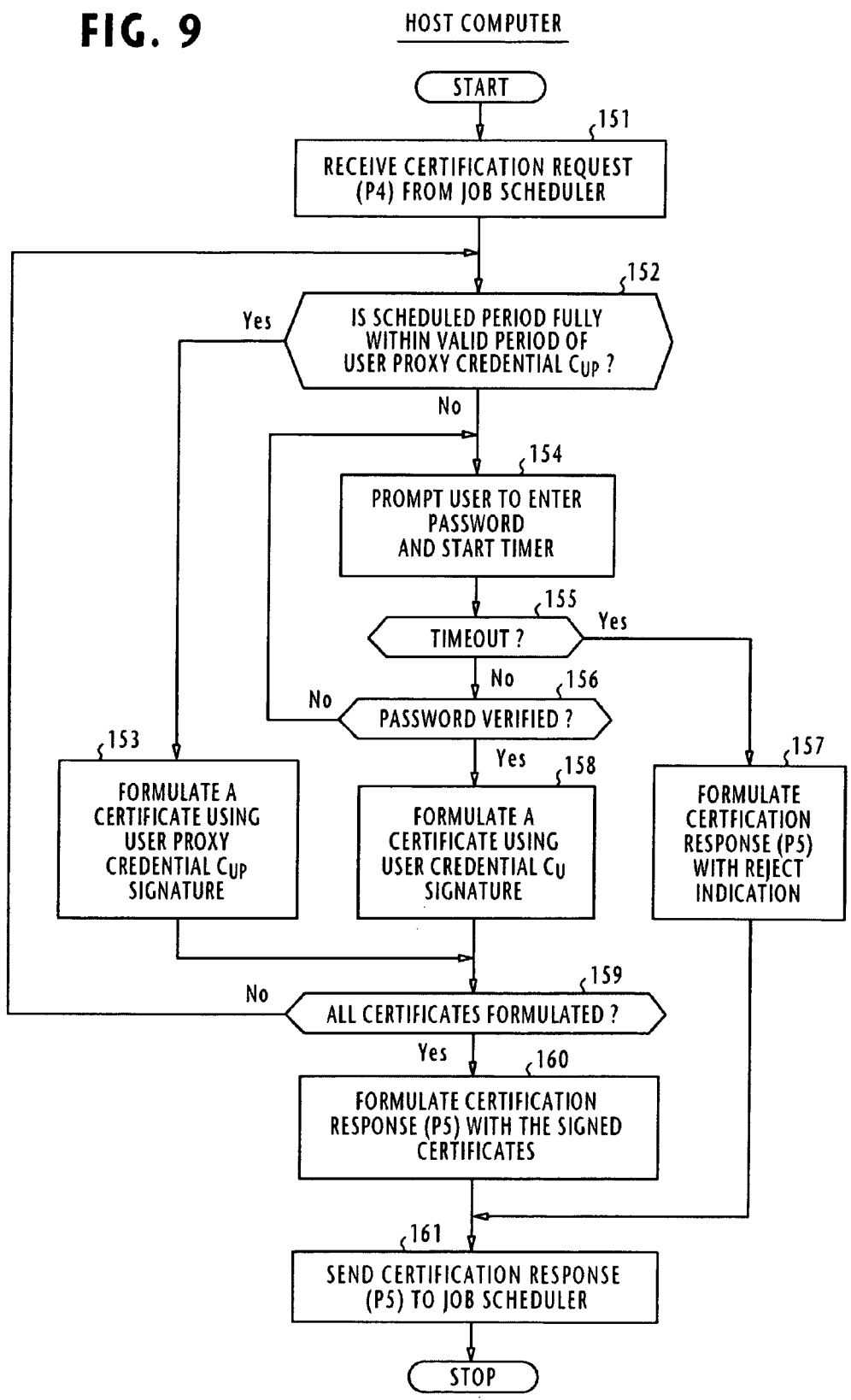
FIG. 9 is a flowchart of the operation of the host computer during a certification process.

Referring briefly to FIG. 9, when the host computer 100 receives a certification request message P4 from the job scheduler 200 (step 151), flow proceeds to step 152 to determine whether or not the scheduled period of a provisionally reserved resource is fully within the valid period of the user proxy credential $C_{UP}$.

Figure 10:
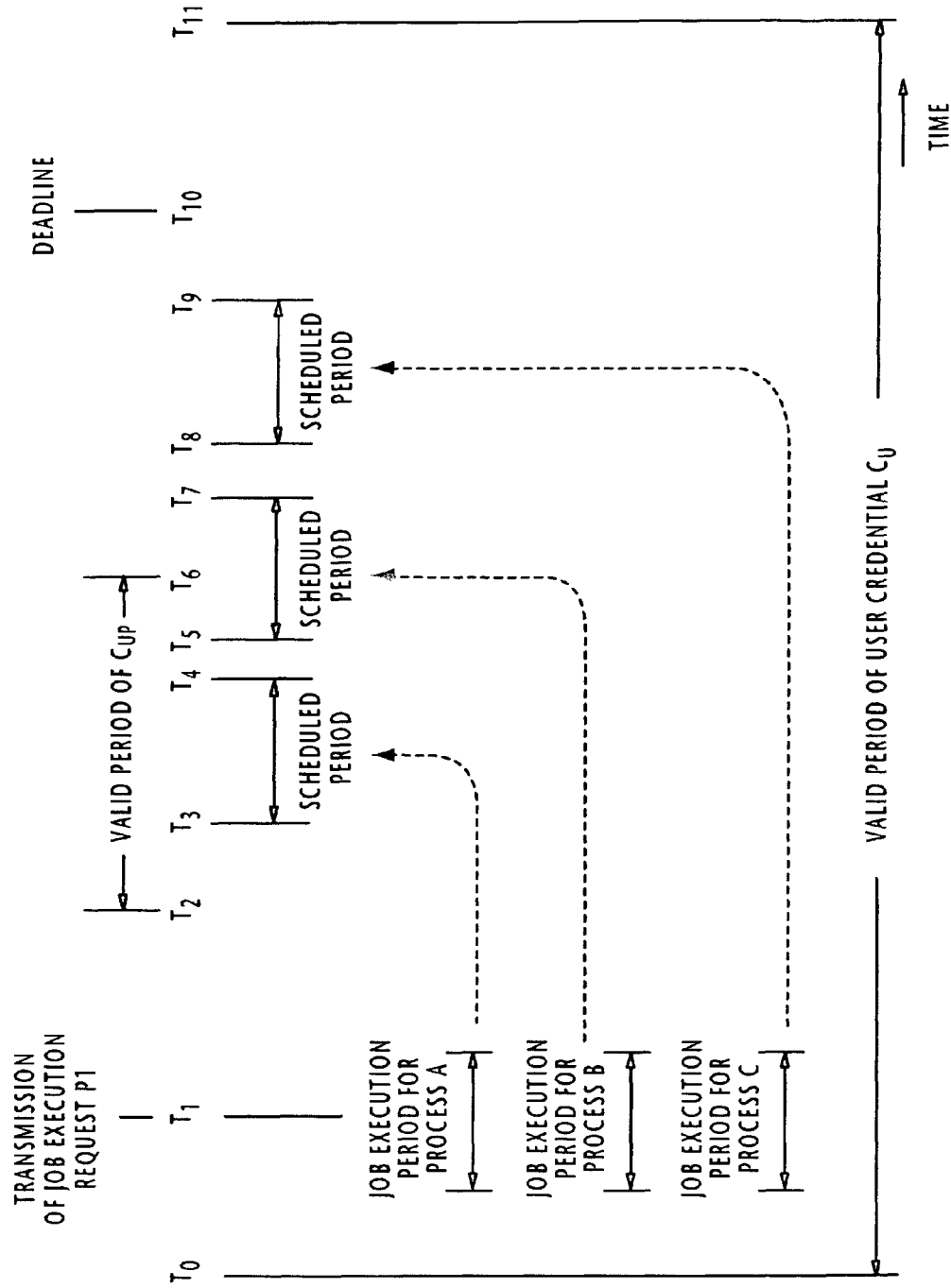
FIG. 10 is a timing diagram illustrating a number of different schedule periods relative to the valid period of a user proxy credential.

Assume that the host computer 100 transmitted the job execution request P1 at time $T_1$ (see FIG. 10), requesting a deadline (time $T_{10}$) within the valid period of user credential $C_U$ that runs from time $T_0$ to time $T_{11}$. If the requested job execution period of a process A is assigned to a scheduled period between times $T_3$ and $T_4$ and if the valid period of user proxy credential $C_{UP}$ runs between T2 and T6, then the host computer 100 determines that the scheduled period $T_3$ to $T_4$ is within the user proxy credential period $C_{UP}$. In this case, the user proxy credential $C_{UP}$ is valid for the full scheduled period $T_3$ to $T_4$ and the certificate for the process A is signed with user proxy credential $C_{UP}$.

If the requested job execution period of a process B is assigned to a scheduled period between times $T_5$ and $T_7$, then the host computer 100 determines that the scheduled period $T_5$ to $T_7$ is not fully within the user proxy credential period $C_{UP}$. In this case, the user proxy credential $C_{UP}$ expires before the end timing $T_7$ of the process B. If the requested job execution period of a process C is assigned to a scheduled period between times $T_8$ and $T_9$, then the host computer 100 determines that the scheduled period $T_8$ to $T_9$ is fully outside of the user proxy credential period $C_{UP}$. In this case, the user proxy credential $C_{UP}$ has already expired before the start timing $T_8$ of the process C. Therefore, for using processes B and C after reservation, the certificate must be signed with user credential $C_{UP}$.

If it is determined that the scheduled period for a resource is fully within the valid period of user proxy credential $C_{UP}$, the decision at step 152 is affirmative and flow proceeds to step 153 to formulate a certification response P5 containing at least one reservation certificate using the user proxy credential $C_{UP}$ signature or the user credential Cu signature. The certification response P5 is then transmitted to the job scheduler 200 at step 161.

If the scheduled period for activating a provisionally reserved resource is not fully within the period B of user proxy credential $C_{UP}$, the decision at step 152 is negative and flow proceeds to step 154 to prompt the user to enter a password and the host computer 100 starts a timer. If the user enters a password while the timer is running, the host computer proceeds from step 155 to step 156 to determine if the entered password is authentic. If not, flow returns to step 154 to repeatedly prompt the user to enter a password. If the timer runs out, flow proceeds to step 157 to formulate a certification response message P5 with a failure indication and transmits it to the job scheduler 200 (step 161). If a verified password is entered (step 156), the host computer proceeds to step 158 to formulate a certificate using the user credential $C_U$ signature. The user credential $C_U$ signature is obtained by combining the password-encrypted user credential $C_U$ stored in the user credential memory 110 with the password detected at step 156.

If signed certificates are formulated for all resource proxies, the decision at step 159 is affirmative and flow proceeds to step 160. Otherwise, flow returns to step 152 to repeat the above process on the certificate of the next resource proxy to produce a signed certificate for the next resource. At step 159, the host computer 100 combines the signed certificates formulated in the above process and formulates a certification response message P5 with the combined certificates (step 160) and transmitted to the job scheduler 200.

Figure 11:
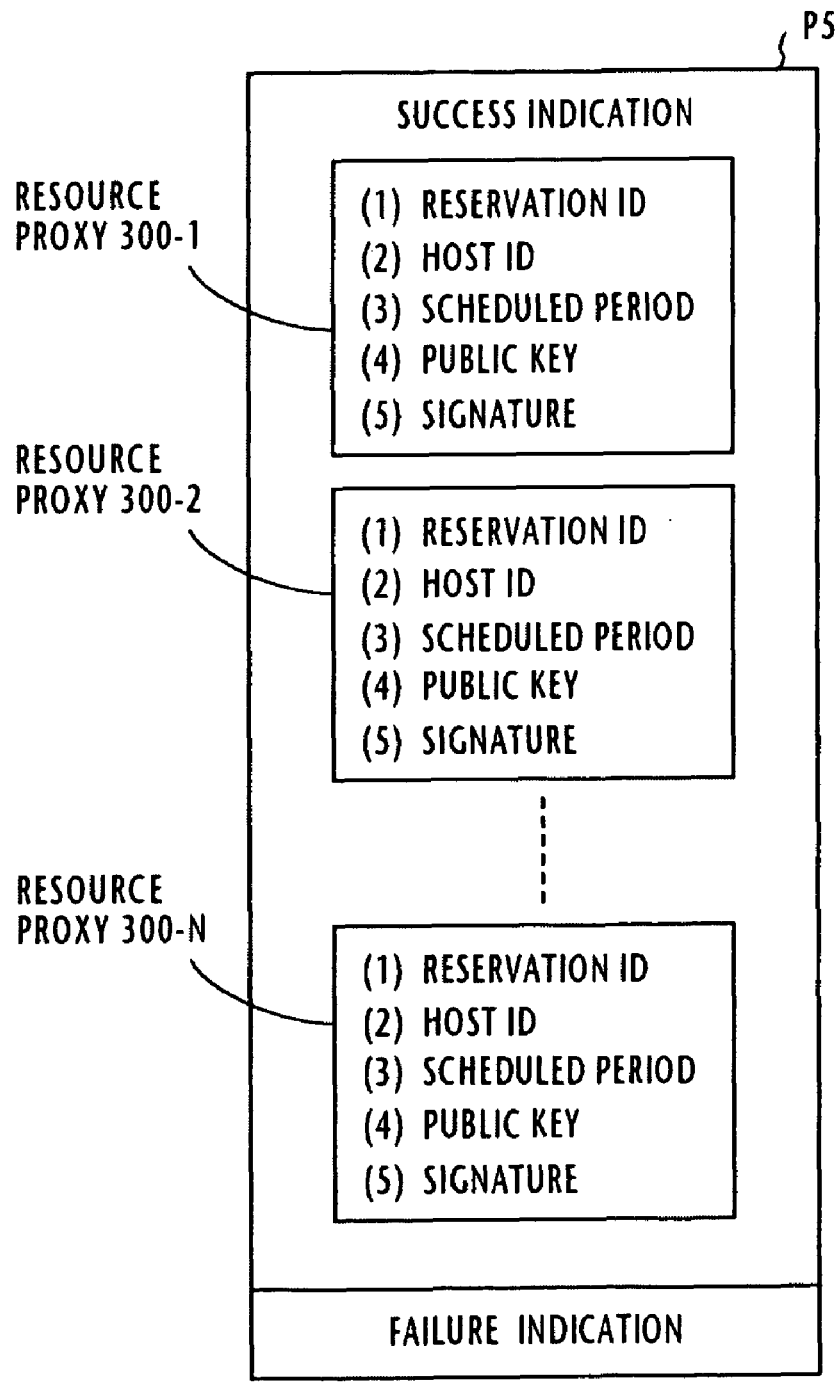
FIG. 11 is an illustration of a certification response message transmitted from the host computer to the job scheduler at the beginning of a formal reservation process.

As shown in FIG. 11, the certification response message P5 includes a success indication field and a failure indication field. The success indication field contains a plurality of user-signed certificates corresponding to the requested resources. Each certificate contains items identical to those of the certification request message P4 with the exception that a user credential $C_U$ signature or a user proxy credential $C_{UP}$ signature is included. If the password is not verified within the timeout period, the failure indication field is marked in the certification response message P5 and no certificates are included.

Returning to FIG. 4, when the job scheduler 200 receives a certification response message P5 (step 257), flow proceeds to step 258 to check to see if properly signed certificates are received from the host computer 100.

If the decision is affirmative at step 258, flow proceeds to step 259 to formulate a formal reservation request message P6 and the job scheduler sends it to each of the resource proxies 300 and waits for a returning formal reservation response message P7. At step 260, the job scheduler 200 checks to see if formal reservation response messages P6 have been received from all the target resource proxies. If not, flow returns to step 259 to repeat the same process on the next resource proxy. If the decision is affirmative at step 260, flow proceeds to step 261 to send a job execution response message P8 to the host computer 100 for indicating a result of the formal reservation.

As shown in FIG. 12, the formal reservation request message P6 transmitted from the job scheduler to each resource proxy includes a signed certificate consisting of four items: (1) reservation ID (i.e., a concatenation of resource ID and a sequence number maintained in the resource proxy 300), (2) host ID, (3) scheduled period, (4) public key and (5) signature.

During the formal reservation process, each of the target resource proxies 300 responds to this formal reservation request message according to the flowchart of FIG. 13 and returns a formal reservation response message P7 to the job scheduler 200 indicating that the formal reservation is successfully completed or not. As shown in FIG. 13, each of the target resource proxies 300 responds to the formal reservation request message P6 from the job scheduler 200 at steps 341, 342 by examining the schedule memory 310 to determine whether the requested resource is actually available for the scheduled period. If not, flow proceeds to step 347 to transmit a reservation (failure) response message P7 to the host computer. If the requested resource is actually available, flow proceeds from step 343 to step 344 to update the schedule memory 310 by setting the provisionally reserved resource in a formally reserved state. At step 345, the resource proxy stores the signed certificate contained in the received formal reservation request message P6 into the credential memory 320 and formulates a process credential $C_P$ with the previously stored private key and the currently stored certificate which contains a copy of the public key previously generated by the resource proxy 300. At step 346, the job scheduler transmits a reservation (success) response message P7 to the host computer 100 and terminates the routine.

Since the process credential $C_P$ is a combined set of a user-signed certificate and a private key derived from a random number, it can be readily used in the public key infrastructure that is extensively adopted in many applications.

Additionally, if the scheduled period of a resource determined by the job scheduler 200 falls within the valid period of the user proxy credential $C_{UP}$, the host computer 100 utilizes the user proxy credential $C_{UP}$, rather than the user credential $C_U$, for signing its certificate. Therefore, the user has no trouble of entering a password.

Figure 14:
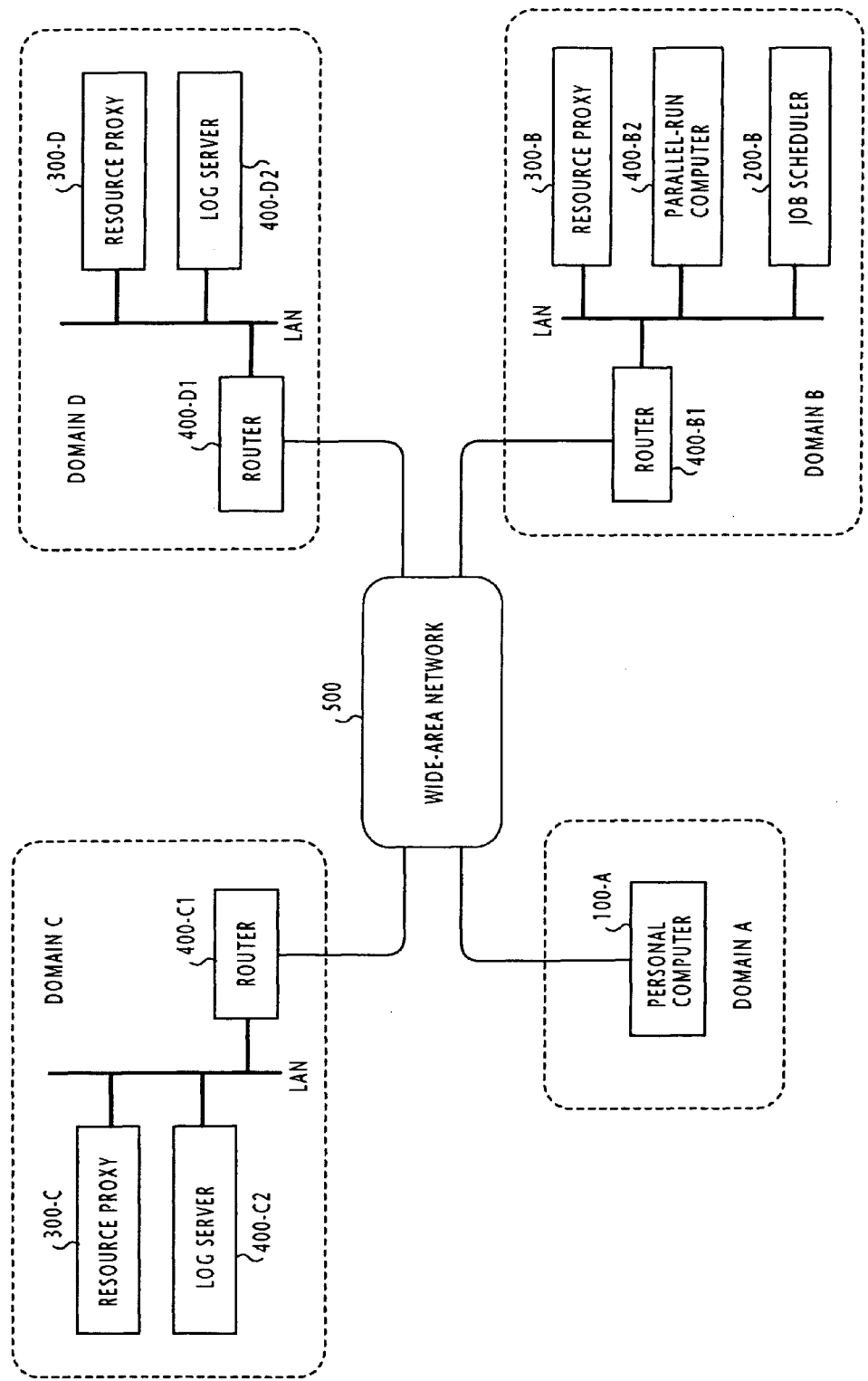
FIG. 14 is a block diagram of a practical embodiment of the distributed computing system of the present invention.

FIG. 14 is a block diagram of a practical form of the reservation system of the present invention.

The system is divided into a number of domains interconnected by a WAN (wide area network) 500. In the domain A is installed a personal computer 100-A, or a host computer holding user proxies for registered users. In the domains B, C and D, resource proxies 300-B, 300-C and 300-D are installed to perform user verification and resource reservation management of the associated resources located in the same domain. The associated resources in the domain B are a router 400-B1 and a parallel computer 400-B2, those in the domain C are a router 400-C1 and a log server 400-C2, and those in the domain D are a router 400-D1 and a log server 400-D2. In the domains C and D, the resources and the resource proxy are interconnected by a local area network, and in the domain B, the resources, the resource proxy and the job scheduler are likewise interconnected by a LAN.

In a typical application it is assumed that data on the distributed log servers 400-C2 and 400-D2 are analyzed by using the parallel computer 400-B2, as used in the analysis of access logs on the WWW (world wide web) and in the analysis of the traffic of a cooperate network. In the domains B, C and D, each router serves as an interface between the LAN and the WAN 500 and includes a packet shaping function that controls the usable bandwidth of the communication between specified devices. Using the packet shaping function, resource reservation of the network bandwidth of a given user is possible.

Log servers 400-C2 and 400-D2 are capable of collecting logs from a WWW server, not shown. Logs saved in these log servers can be accessed from other computers via the WAN 500. Further, the log servers are capable of controlling the network bandwidth of a given user. By making a reservation for reading a specified log via the network, priority is given to the specified log. Parallel computer 400-B2 is capable of performing high-speed analysis of data on the log servers and the CPU's of the parallel computer are the targets of resource that can be reserved. Reservation can be made on a different number of CPU's depending on user's requests. In each domain, reservation status of each resource is managed by the resource proxy of the domain. Therefore, a reservation request or a resource status enquiry on a desired resource must be sent to the resource proxy of the domain in which the desired resource is located.

Job scheduler 200-B controls the personal computer 100-A and makes a resource reservation of log servers 400-C2, 400-D2 and parallel computer 400-B2 and reads logs on the reserved log servers 400-C2 and 400-D2 via the network and analyzes the logs by using the reserved parallel computer 400-B2.

This process is initiated by a user on the personal computer 100-A by entering a password to create a user proxy having a user proxy credential valid for a period of 12 hours, for example, and then entering input parameters including resources (parallel computer 400-B2, log servers 400-C2, 400-D2, routers 400-B1, 400-C1, 400-D1), a program (analysis program to be activated on the parallel computer 400-B2, and deadline (36 hours later, for example). A job execution request message is formulated with these items of information and transmitted to the job scheduler 200-B.

In response to the job execution request message, the job scheduler 200-B exchanges provisional reservation request messages and provisional reservation response messages with the resource proxies 300-B, 300-C and 300-D to determine a scheduled period of two hours, for example, running from 30 hours later to 32 hours later from the current time of day. During this process, each of the resource proxies examines its schedule memory to determine the scheduled period if the requested resource is available. If available, each resource proxy makes a provisional reservation of the requested resource in the schedule memory and sends a certification request message containing a public key to the job scheduler 200-B and generates and stores a private key in its credential memory.

When the job scheduler 200-B receives the certification request messages concerning all the requested resources, and determines if these certification request messages indicate that provisional reservation is successful for all the requested resources. If this is the case, the job scheduler 200-B transmits a certification request message containing at least the scheduled period of each provisionally reserved resource to the personal computer 100-A for certificating each of the provisionally reserved resources by acquiring a signature from the user for each of the certificates.

On receiving the certification request from the job scheduler, the personal computer 100-A checks to see if the scheduled period of each resource is within the 12-hour period of the user proxy credential. If the scheduled period of a provisionally reserved resource is outside of the valid period of user proxy credential, the personal computer 100-A prompts the user to enter a password. If the password is verified, signature of the user credential is appended to the certificate of the resource. The signed certificates of all provisionally reserved resources are encapsulated in a single certification response message and transmitted to the job scheduler 200-B.

In response to the certification response message from the personal computer 100-A, the job scheduler 200-B transmits a formal reservation request message to each of the resource proxies, containing a plurality of certificates each containing at least the public key and the user signature. When the resources are formally reserved, the resource proxies form respective process credentials with the received certificates and the previously stored transmit formal reservation response messages to the job scheduler 200-B, which in turn transmits a reservation complete message to the personal computer 100-A.

After 30 hours from the entry of the request by the user to the personal computer 100-A, the formally reserved resources are automatically allocated to the user. On the parallel computer 400-B, the analysis program is activated and on each of the log servers and the routers, network bandwidth is allocated to the user. In this process, the process credentials produced by the resource proxies are used to verify the user. As a result of the process credentials, nothing is required of the user to enter data during this user verification process. The analysis program activated on the parallel computer 400-B2 is transmitted via the network to each of the log servers 400-C2 and 400-D2 to read the logs on these servers. During this transaction, the process credentials are used to automatically perform user verification between the routers 400-C1 and 400-D1, thus completely relieving the user from the trouble of entering an analyzing program during resource reservation and the trouble of entering verification data during job execution. During the job execution period, the public and private keys of the process credential of a registered user are used in pair to perform process-to-resource authentication by using a client verification protocol known as "Secure Socket Layer". Additionally, if the user has reserved a number of processes on a number of different resources and a communication proceeds between such processes, the paired keys are used to perform process-to-process authentication that verifies that these processes have been reserved by the user.

What is claimed is:

1. A distributed computing system comprising:
a communications network;
an end terminal which transmits a job execution request message of a user to the communications network;
a job scheduler, responsive to the job execution request message, activates a scheduling process and a provisional reservation process, said job scheduler determines, in the scheduling process, a resource and a job execution period necessary for executing a job on said resource based on contents of said job indicated in said job execution request message, and said job scheduler generates, in the provisional reservation process, a reservation request message containing said job execution period and a resource identity of said determined resource, and transmits said reservation request message to the communications network; and
a resource proxy connected to said communications network for receiving the reservation request message, said resource proxy includes a schedule memory that maintains a time schedule for users for using the processes of associated resources, said resource proxy determines a scheduled period of a resource identified by said resource identity contained in the received message based on said job execution period by examining the schedule memory, said scheduled period indicating the time of day for starting the job on the resource and the time of day for ending the job, and said resource proxy makes a reservation of said identified resource according to said determined scheduled period, said resource proxy generates a private key, and transmits a reservation response message containing a public key to said job scheduler, wherein said job scheduler acquires a certificate electronically signed by said user from said end terminal in response to said reservation response message, said certificate including a copy of said public key and a valid period of said certificate based on said job execution period, and transmits the certificate to said resource proxy;

wherein said resource proxy makes said reservation of said resource in response to receipt of said certificate from the job scheduler, and forms a combined set of said private key and the received certificate to produce a process credential for verifying the user when the reserved resource is activated during said scheduled period;

wherein if the job scheduler successfully activates the scheduling process, determines the resource and the job execution period, generates a reservation request message, and transmits the reservation request message and the resource proxy successfully determines a scheduled period, makes a reservation, generates a private key and transmits a reservation response message, then the job scheduler formulates a job execution schedule for the resources, and if the scheduling process fails, a failure indication response message is transmitted to the host.

2. The distributed computing system according to claim 1, wherein said job scheduler further, responsive to the job execution request message, activates a certificate acquisition process for transmitting a certification request message to said end terminal containing said determined scheduled period in response to said reservation response message from said resource proxy, and wherein said end terminal which receives said certification request message from a job scheduler makes a decision whether the scheduled period contained in the received message is within the valid period of user proxy credential, and transmits to said job scheduler said certificate containing a signature of the user proxy credential if said decision is affirmative or a signature of user credential if said decision is negative.

3. the distributed computing system according to claim 1, wherein said resource proxy;

stores said combined set of said private key and said certificate as a process credential in a memory;

verifies a user by using the stored process credential; and allocates a resource based on said certificate to the verified user.

4. The distributed computing system of claim 1, wherein said reservation request message contains a plurality of job execution periods and resource identities of a plurality of resources, and wherein said job scheduler further, responsive to the job execution request message, activates a formal reservation and notification process for:

formulating a certification response message containing a plurality of certificates signed by said user, each of the certificates corresponding to each of said plurality of resources and including a copy of said public key, and transmitting the certification response message to said resource proxy, wherein said resource proxy further receives the certification response message; and makes a reservation of a plurality of resources according to the certificates contained in the received certification response message.

5. The distributed computing system of claim 1, wherein said certificate further contains a copy of said user identity and said determined scheduled period.

6. A job scheduler for a distributed computing system, wherein the system comprises:

a communications network, an end terminal for transmitting a job execution request message of a user to the communications network, and a resource proxy connected to the network for receiving a reservation request message from the network, said resource proxy:

includes a schedule memory that maintains a time schedule for users for using the processes of associated resources, determines a scheduled period of a resource identified by a resource identity contained in the received message based on a job execution period by examining the schedule memory, said scheduled period indicating the time of day for starting the job on the resource and the time of day for ending the job, and makes a reservation of the identified resource according to the determined scheduled period, generates a private key and transmits a reservation response message, containing a key to said job scheduler, and the job scheduler comprises: a scheduling processing circuitry which, responsive to the job execution request message from the end terminal, determines a resource and a job execution period necessary for executing a job on said resource based on contents of said job indicated in said job execution request message, and provisional reservation processing circuitry which generates said reservation request message containing said job execution period and said resource identity of said determined resource, and transmits said reservation request message to said resource proxy, wherein said scheduling processing circuitry acquires a certificate electronically signed said user from said end terminal in response to said reservation response message, said certificate including a copy of said public key and a valid period of said certificate based on said job execution period, and transmits the certificate to said resource proxy, and wherein said resource proxy makes said reservation of said resource in response to receipt of said certificate from the job scheduler, and forms a combined set of said private key and the received certificate to produce a process credential for verifying the user when the reserved resource is activated during said scheduled period;

wherein if the job scheduler successfully determines the resource and the job execution period, generates a reservation request message, and transmits the reservation request message and the resource proxy successfully determines a scheduled period, makes a reservation, generates a private key and transmits a reservation response message, then the job scheduler formulates a job execution schedule for the resources, and if the job scheduler fails to formulate the job execution schedule for the resources, a failure indication response message is transmitted to the host.

7. An end terminal for a distributed computing system, wherein the system comprises:

a communications network, a job scheduler connected to the network for receiving a job execution request message from the network, determining a resource and a job execution period necessary for executing a job on said resource based on contents of said job indicated in said job execution request message, generating a reservation request message containing said job execution period and a resource identity of said resource, and transmitting said reservation request message to the network, and a resource proxy connected to said job scheduler via the network for receiving the reservation request message, including a schedule memory that maintains a time schedule for users for using the processes of associated resources, determining a scheduled period of said resource based on said job execution period by examining the schedule memory, said scheduled period indicating the time of day for starting the job on the resource and the time of day for ending the job, generating a private key, and transmitting a reservation response message containing a public key to said job scheduler which is responsive to said reservation response message for acquiring a certificate electronically signed by said user from said end terminal and transmitting the certificate to said resource proxy which is responsive to said certificate for making a reservation of a resource according to said determined scheduled period and the resource identity of said reservation request message, the resource proxy comprising:

a job execution processing circuitry which transmits said job execution request message to said job scheduler via the network, a certification processing circuitry which, responsive to a certification request message from said job scheduler containing said scheduled period, makes a decision whether the scheduled period contained in the received message is within the valid period of user proxy credential, and transmits to said job scheduler said certificate containing a signature of the user proxy credential if said decision is affirmative or a signature of user credential if said decision is negative, wherein said job scheduler acquires a certificate electronically signed by said user from said end terminal in response to said reservation response message, said certificate including a copy of said public key and a valid period of said certificate based on said job execution period, and transmits the certificate to said resource proxy, and wherein said resource proxy makes said reservation of said resource in response to receipt of said certificate from the job scheduler, and forms a combined set of said private key and the received certificate to produce a process credential for verifying the user when the reserved resource is activated during said scheduled period;

wherein if the job scheduler successfully determines the resource and the job execution period, generates a reservation request message, and transmits the reservation request message and the resource proxy successfully determines a scheduled period, makes a reservation, generates a private key and transmits a reservation response message, then the job scheduler formulates a job execution schedule for the resources, and if the job scheduler fails to formulate the job execution schedule for the resources, a failure indication response message is transmitted to the host.

8. A resource proxy for a distributed computing system, wherein the system comprises:

a communications network, an end terminal for transmitting a job execution request message of a user to the communications network, and a job scheduler responsive to the job execution request message, for determining a resource and a job execution period necessary for executing a job on said resource based on contents of the job indicated in said job execution request message, generating a reservation request message containing said job execution period and a resource identity of said determined resource, and transmitting said reservation request message to the network, and the resource proxy responsive to a certification request message from the network for acquiring a certificate electronically signed by said user from said end terminal and transmitting the certificate to said network, the resource proxy:

includes a schedule memory which maintains a time schedule for users for using the processes of associated resources;

receives the reservation request message from said job scheduler, determines a scheduled period of said resource based on said job execution period by examining the schedule memory, said scheduled period indicating the time of day for starting the job on the resource and the time of day for ending the job; and transmits to said job scheduler said certification request message, and responsive to said certificate from said job scheduler, makes a reservation of a resource according to the resource identity of said reservation request message and said determined scheduled period, generates a private key, and transmits a reservation response message containing a public key to said job scheduler, wherein said job scheduler acquires a certificate electronically signed by said user from said end terminal in response to said reservation response message, said certificate including a copy of said public key and a valid period of said certificate based on said job execution period, and transmits the certificate to said resource proxy, and wherein said resource proxy makes said reservation of said resource in response to receipt of said certificate from the job scheduler, and forms a combined set of said private key and the received certificate to produce a process credential for verifying the user when the reserved resource is activated during, said scheduled period;

wherein if the job scheduler successfully determines the resource and the job execution period, generates a reservation request message, and transmits the reservation request message and the resource proxy successfully determines a scheduled period, makes a reservation, generates a private key and transmits a reservation response message, then the job scheduler formulates a job execution schedule for the resources, and if the job scheduler fails to formulate the job execution schedule for the resources, a failure indication response message is transmitted to the host.

9. A resource proxy for a distributed computing system, wherein the system includes:
a communications network,
an end terminal for transmitting a job execution request message to said communications network, and
responsive to a certification request message from said network for making a decision whether a scheduled period of a resource is within a specified period and transmitting to said network a certification response message containing a certificate signed with a user proxy credential if said decision is affirmative or signed with a user credential if said decision is negative, and
a job scheduler connected to said network for receiving said job execution request message from said end terminal and transmitting to said network a provisional reservation request message, and
responsive to a provisional response message from said network for transmitting a certification request message to said end terminal, and
responsive to a certification response message from said end terminal for transmitting a formal reservation request message to said network containing said signed certificate, includes a schedule memory for maintaining a time schedule for users for using the processes of associated resources;
receives said provisional reservation request message from said job scheduler;
determines a scheduled period of said resource based on a job execution period by examining the schedule memory, said scheduled period indicating the time of day for starting the job on the resource and the time of day for ending the job;
transmits to said job scheduler said certification request message, and responsive to said certification from said job scheduler, making a reservation of a resource according to the resource identity of said reservation request message and said determined scheduled period;
makes a provisional reservation of a resource according to the received request message;
formulates a private key using a random number, and transmitting said provisional response message comprising a public key to said network;
includes a credential memory for storing the private key;
responsive to said formal reservation request message from the job scheduler, makes a formal reservation of said resource; and
forms a process credential with said private key, a valid period of said certificate based on said job execution period and the signed certificate contained in the formal reservation request message for use in verifying the user when the reserved resource is used;
wherein if the job scheduler successfully determines the resource and the job execution period, generates a reservation request message, and transmits the reservation request message and the resource proxy successfully determines a scheduled period, makes a reservation, generates a private key and transmits a reservation response message, then the job scheduler formulates a job execution schedule for the resources, and
if the job scheduler fails to formulate the job execution schedule for the resources, a failure indication response message is transmitted to the host.

10. The method of activating distributed computing resources, comprising the steps of:

a) transmitting a job execution request message of a user from an end terminal;
b) receiving, at a job scheduler, said job execution request message from the end terminal and determining a resource and a job execution period necessary for executing a job on said resource based on contents of said job indicated in said job execution request message and formulating a reservation request message containing the determined job execution period and a resource identity of said resource and transmitting the reservation request message; and
c) receiving, at a resource proxy, the reservation request message from the job scheduler and determining a scheduled period of a resource identified by the resource identity contained in the received message based on said job execution period contained in the received message, and making a reservation of said resource according to said determined scheduled period indicating the time of day for starting the job on the resource and the time of day for ending the job;
wherein step (c) comprises the steps of:
c1) generating, at said resource proxy, a private key;
c2) transmitting a reservation response message containing a public key from the resource proxy to said job scheduler;
c3) acquiring a certificate electronically signed by said user from said end terminal in response to said reservation response message, said certificate including a copy of said public key and a valid period of said certificate based on said job execution period;
c4) transmitting the acquired certificate from said job scheduler to said resource proxy;
c5) making, at said resource proxy, said reservation of said resource in response to receipt of said certificate; and
c6) forming a process credential with said private key and the acquired certificate for verifying the user when the reserved resource is activated during said scheduled period;
wherein if the job scheduler successfully determines the resource and the job execution period, formulates a reservation request message, and transmits the reservation request message and the resource proxy successfully determines a scheduled period, makes a reservation, generates a private key and transmits a reservation response message, then the job scheduler formulates a job execution schedule for the resources, and
if the job scheduler fails to formulate the job execution schedule for the resources, a failure indication response message is transmitted to the host.

11. The method of claim 10, wherein step (c3) comprises the steps of:
transmitting a certification request message from said job scheduler to said end terminal containing said determined scheduled period;
receiving, at said end terminal, said certification request message;
making a decision, at said end terminal, whether the scheduled period contained in the received reservation response message is within the valid period of user proxy credential; and
transmitting, from the end terminal to said job scheduler, said certificate containing a signature of said user proxy credential if said decision is affirmative or a signature of user credential if said decision is negative.

12. The method of claim 10, wherein said credential forming step comprises the steps of:
- storing said process credential in a memory;
- verifying a user by using the stored process credential; and
- allocating a reserved resource to the verified user.

13. The method of claim 10, wherein said reservation request message contains a plurality of job execution periods and a plurality of resource identities of multiple resources, and wherein said reservation response message contains a public key, and wherein the acquiring step comprises the steps of:
- formulating a certification response message containing a plurality of certificates signed by said user, each of the certificates corresponding to each of said plurality of resources and including a copy of said public key; and
- transmitting each of said certificates to a corresponding one of said multiple resources from said job scheduler.

14. The method of activating distributed computing resources, comprising the steps of:
- a) transmitting a job execution request message of a user from an end terminal;
- b) receiving, at a job scheduler, said job execution request message from the end terminal and determining a resource and a job execution period necessary for executing a job on said resource based on contents of said job indicated in said job execution request message and formulating a reservation request message containing the determined job execution period and a resource identity of said resource and transmitting the reservation request message; and
- c) receiving, at a resource proxy, the reservation request message from the job scheduler and determining a scheduled period of a resource identified by the resource identity contained in the received message based on said job execution period contained in the received message, making a reservation of said resource according to said determined scheduled period indicating the time of day for starting the job on the resource and the time of day for ending the job, generating a private key, and transmitting the reservation comprising a public key to said job scheduler;

wherein step (b) comprises the steps of:
- determining multiple resources and a plurality of job execution periods necessary for executing a job on said multiple resources based on contents of said job indicated in said job execution request message;
- formulating a plurality of reservation request messages respectively containing the determined job execution periods and a plurality of resource identities of said multiple resources; and
- transmitting the reservation request messages respectively to a plurality of resource proxies, wherein said job scheduler acquires a certificate electronically signed by said user from said end terminal in response to said reservation response message, said certificate including a copy of said public key and a valid period of said certificate based on said job execution period, and transmits the certificate to said resource proxy; and wherein said resource proxy makes said reservation of said resource in response to receipt of said certificate from the job scheduler, and forms a combined set of said private key and the received certificate to produce a process credential for verifying the user when the reserved resource is activated during said scheduled period;

wherein if the job scheduler successfully activates the scheduling process, determines the resource and the job execution period, formulates a reservation request message, and transmits the reservation request message and the resource proxy successfully determines a scheduled period, makes a reservation, generates a private key and transmits a reservation response message, then the job scheduler formulates a job execution schedule for the resources, and if the job scheduler fails to formulate the job execution schedule for the resources, a failure indication response message is transmitted to the host.

15. The method of claim 10, wherein step (c,) comprises the steps of: setting said resource in a provisionally reserved state in a first memory; and storing said private key in a second memory; and
- wherein step (c5) comprises the step of setting said resource in a formally reserved state
- in said first memory in response to receipt of said certificate from the job scheduler, and step (c6) comprises the steps of:
- storing the received certificate in said second memory; and
- formulating said process credential in said second memory with the stored private key and the stored certificate.

* * * * *